United States Patent [19]
Gerdemann et al.

[11] Patent Number: 5,788,736
[45] Date of Patent: Aug. 4, 1998

[54] RECOVERY OF TITANIUM VALUES FROM TITANIUM GRINDING SWARF BY ELECTRIC FURNACE SMELTING

[75] Inventors: Stephen J. Gerdemann; Jack C. White, both of Albany, Oreg.

[73] Assignee: The United States of America as represented by the United States Department of Energy, Washington, D.C.

[21] Appl. No.: 674,003

[22] Filed: Jul. 1, 1996

[51] Int. Cl.$^6$ .................................................. C22B 34/12
[52] U.S. Cl. ........................... 75/10.61; 75/612; 420/590
[58] Field of Search ............................. 75/10.26, 10.61, 75/612; 420/590

[56] References Cited

U.S. PATENT DOCUMENTS

| | | | |
|---|---|---|---|
| 3,868,441 | 2/1975 | Agee | 423/69 |
| 3,999,976 | 12/1976 | Schubert | 75/10.66 |
| 4,088,176 | 5/1978 | Simons | 164/66.1 |
| 4,108,644 | 8/1978 | Walberg et al. | 75/10.26 |
| 4,407,672 | 10/1983 | Deuschle | 75/10.66 |
| 5,171,359 | 12/1992 | Megy | 75/230 |

*Primary Examiner*—Melvyn Andrews
*Attorney, Agent, or Firm*—Mark LaMarre; Mark P. Dvorscak; William R. Moser

[57] ABSTRACT

A method for the recovery of valuable materials from titanium grinding swarf is provided comprising the steps of sieving the accumulated titanium grinding swarf to remove unwanted coarse trash and grinding wheel fragments, pelletizing, and smelting in an electric arc furnace to produce ferrotitanium and/or high titanium slag.

10 Claims, 1 Drawing Sheet

RECOVERY OF TITANIUM VALUES FROM TITANIUM GRINDING SWARF BY ELECTRIC FURNACE SMELTING

BACKGROUND OF THE INVENTION

1. Field of the Invention

This invention relates to the process of recovering titanium value from waste generated in machining process on titanium metals.

2. Description of the Related Art

The grinding process on titanium metal creates a swarf containing partially oxidized titanium metal, coarse trash, and grinding wheel fragments. As a waste by-product, grinding swarf is stockpiled and later disposed. Because titanium is a highly reactive material, it has been known for these swarf piles to spontaneously ignite. The resultant titanium oxide is extremely brittle and of little titanium value. Currently, there is no processing method to render the grinding swarf chemically stable in the environment. Accumulation of titanium grinding swarf is estimated to reach one million pounds per year. Recovery of material from accumulating titanium grinding swarf would conserve a valuable resource and end problems associated with its accumulation.

The titanium value may be recovered from grinding swarf by rechlorinating it, introducing it with titanium tetrachloride, and reducing the mixture to titanium chloride. Titanium chloride, however, does not have nearly the market value as the scraps of titanium metal mixed with the grinding swarf.

Processes and methods for recovery of iron units from flue dust are similar to the method described herein and are generally well known in the art. One such method is described in U.S. Pat. No. 4,407,672, issued Oct. 4, 1983, to Ruger A. Deuschle and Charles P. Mueller, entitled "Method for the Recovery of Iron Units from Flue Dust Generated in a Steel Making Process." Recovery of iron units from flue dust does relate to the problems of handling fine particle material but does not address the problems associated with highly reactive titanium and the need to keep materials out of the recovery process which could contaminate the final ferrotitanium and/or titanium slag produced.

The present invention overcomes deficiencies of the prior art methods for recovering value from what is otherwise considered a waste by-product of the titanium and steel industries. It provides a method of handling and smelting titanium grinding swarf without contaminating on going ferrotitanium and titanium slag production processes. In addition to recovering value from the grinding swarf, the problem of disposing of the metallic waste is solved and the recovered titanium will contribute by increasing concentrations of titanium in high titanium slag and ferrotitanium for the steel industry.

SUMMARY OF THE INVENTION

The present invention is a method for the recovery of valuable materials from accumulating industrial waste in the metals industry. High titanium grinding swarf, containing approximately 85-percent titanium metal is sieved to remove coarse trash and grinding wheel fragments. The resultant fine grained material is pelletized with non-sulfur containing binders to create a stronger and more stable form. In the preferred practice of the method, pelletized grinding swarf is smelted in an electric arc furnace to produce ferrotitanium and/or titanium slag for the steel industry.

The objectives of this invention address both environmental and industry goals by providing a method to end problems associated with the accumulation of grinding swarf and to recover and conserve a valuable titanium resource. Specifically, one objective of the invention is to end the considerable problem created by the accumulation of this highly reactive material by rendering it into a stronger and more stable form for handling. A second objective is to conserve titanium resources by reusing materials which would ordinarily be oxidized and discarded. A final objective is to enhance the value of titanium and steel alloys produced by increasing their concentrations of titanium.

DESCRIPTION OF THE PREFERRED EMBODIMENTS

Figure 1:
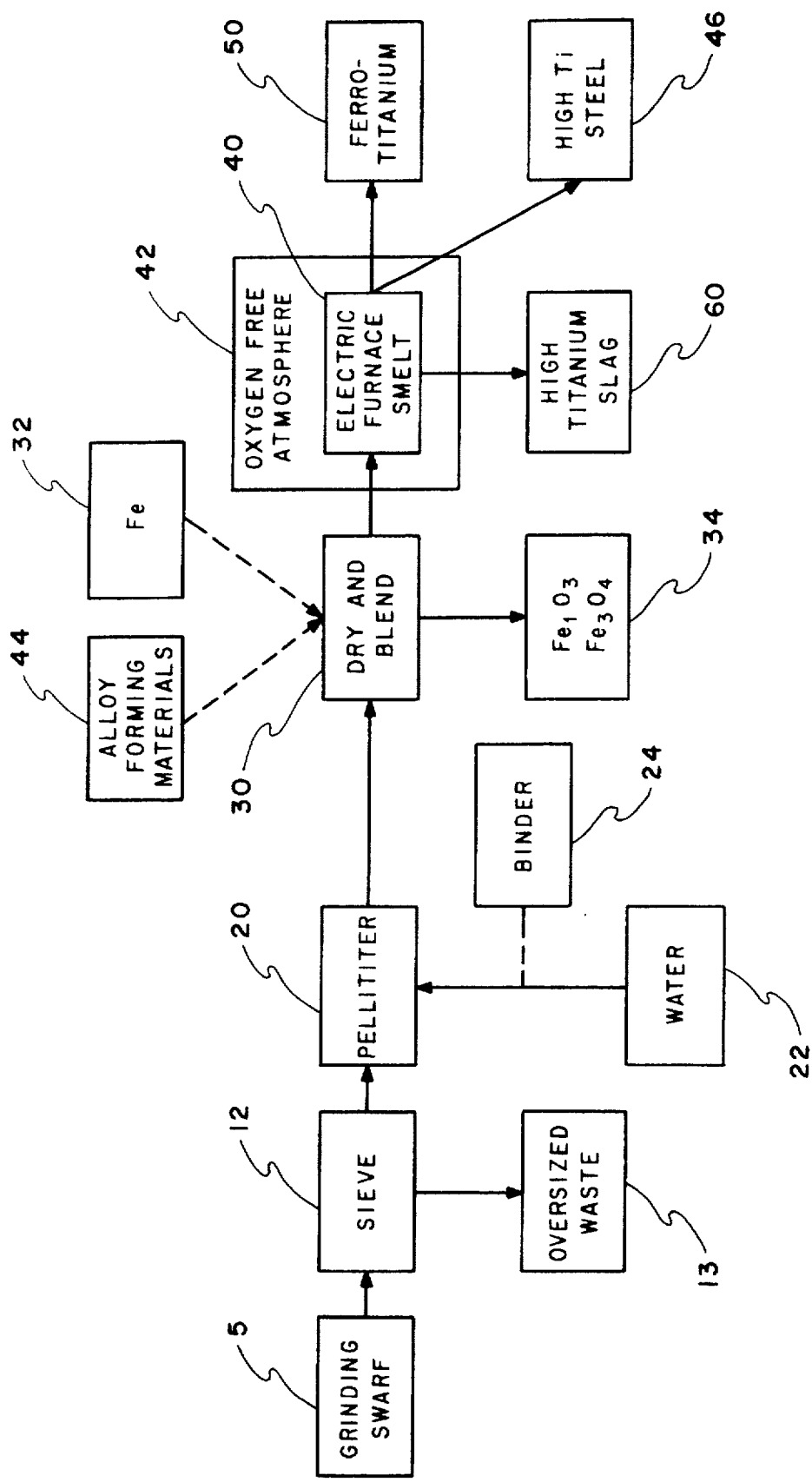
FIG. 1 is a schematic flow diagram, in block diagram form, of a collection and pelletizing system and method in accordance with the present invention.

The method described below may be carried out entirely with equipment standard in the industry. The process begins with a by-product from the steel making industry created during the machining process of titanium ingot—Titanium grinding swarf 5. Titanium grinding swarf 5 consist of fine grained metal particles containing about 85-percent titanium, coarse trash, and grinding wheel fragments. As illustrated in FIG. 1, the titanium grinding swarf 5 is collected after machining processes and stockpiled. Unwanted materials mixed with fine grained, partially oxidized titanium metal particles, must be separated. To remove these larger particles, the stockpiled grinding swarf 5 is passed though a sieve 12. Oversized particles not passing through the sieve 12 are removed and discarded 13.

The remaining fine grained, grinding swarf particles are formed into pellets using any pelletizing method 20 well known in the art and commercially available. As shown in FIG. 1, and as well known in the art, pelletizing or agglomerating processes require the addition of water 22 as a binder to help form the smaller particles into larger pellets. The purpose of forming the sieved titanium grinding swarf into pellets is to improve strength and stability characteristics for transport and handling. Although these characteristics may be affected by several factors, they may be controlled with slight variations of residence time, adjustment of the flow of water into the pelletizing apparatus, or variation in the type of binder used. All these process to control final pellet strength and stability characteristics are well known in the art and may be varied without departing from the scope and concept of the present invention.

Other binders 24 may be introduced to aid the pelletizing process 20. It is important, however, that no binders 24 be used in the process which could contaminate steel products to which the recovered titanium will be added. Suitable binders 24 include sugar, molasses, hydrolyzed starch, and southern bentonite. Others binders 24 may be substituted, all of which provide non-contaminating and non-dusting furnace feed. Western bentonite or sodium silicate is to be particularly avoided in preparation of titanium grinding swarf pellets for addition into high titanium slag for use in chlorination. Sodium chloride forms sticky liquid phases in fluidized bed chlorinators. Therefore, it is preferred that only non-sodium containing materials be used as binders for chlorination feed materials.

Once the titanium grinding swarf is removed from the pelletizing apparatus, it is dried to a constant weight 30. The purpose of such drying is to reduce the chances of the titanium within the pellets reacting with oxygen within the water binder 22 or the other binder 24.

Once the grinding swarf has been pelletized, it may be stored until such time as it is to be added with normal steel alloy forming materials 44, such as iron, manganese and carbon. The mixture is smelted in an electric arc furnace 40, with the production of high titanium steel 46. To further guard against titanium reacting with available oxygen, the pelletized grinding swarf is fed into the electric arc furnace in an oxygen-free atmosphere 42. For the same reason, neither oxygen furnaces nor open hearth furnaces are suitable for smelting the titanium grinding swarf pellets. Rather, an electric smelting furnace 40 is particularly suitable for use with this process. To create an oxygen-free atmosphere 42, argon, or other inert gas, may be used to blanket the smelting furnace 40.

In a second embodiment of this process, the pelletized titanium grinding swarf is smelted in a suitable furnace 40 under oxygen-free conditions with the addition of alloy forming materials scrap iron, sponge iron, or other suitable source of iron 32. This second embodied process will maximize the amount of ferrotitanium 50 produced from the titanium contained in the grinding swarf and thereby maximizing the value of contained titanium.

In a third embodiment, the sieved and pelletized titanium grinding swarf may be blended 25 with alloy forming materials iron oxides ($Fe_2O_3$ or $Fe_3O_4$) 34 to produce superior quality high titanium slag 60 that is low in metals that could form sticky chlorides in fluidized bed chlorinators. Titanium metal will react chemically with iron oxide 34 by a thermite reaction mechanism to produce significant amounts of heat. This reactive furnace feed material will be partially self-heating thereby minimizing electric power costs for electric furnacing 40.

Adding the pelletized titanium grinding swarf will increase the titanium concentrations in ferrotitanium and/or titanium slag produced. Both ferrotitanium and high titanium slag are valuable commercial products.

From the description of the invention and its alternative embodiments, it can be seen that the proposed method for combatting disposal problems associated with accumulating titanium grinding swarf while recovering a valuable resource contained within it is relatively simple and inexpensive requiring no new equipment to employ. While the methods described constitute preferred embodiments of the invention, it will be recognized by those skilled in the art that changes may be made without departing from the scope of the invention as defined in the appended claims.

We claim:

1. A method of producing titanium steel, slag, ferrotitanium, or other alloy from titanium grinding swarf, consisting of the steps of:

collecting grinding swarf waste, comprising finely ground partially oxidized high titanium metal swarf, coarse trash and grinding media, from the processing of a titanium ingot;

sieving the grinding swarf to remove coarse trash and grinding media, leaving fine grained, partially oxidized high titanium metal swarf;

agglomerating the sieved swarf with a non-sodium containing binder into pellets in a pelletizing apparatus;

feeding the pellets and mixing with alloy forming materials into an electric arc furnace; and smelting the pellets and alloy forming materials in an oxygen-free atmosphere.

2. The method of claim 1 wherein the pellets are dried to constant dry weight.

3. The method of claim 1 wherein an inert gas blanket is used to create an oxgyen-free atmosphere excluding oxygen while smelting pelletized titanium grinding swarf in an electric arc furnace.

4. The method of claim 3 wherein the inert gas is argon.

5. The method of claim 1 wherein the sodium-free binder is selected from the class consisting of water, sugar, molasses, hydrolyzed starch, and southern bentonite.

6. The method of claim 1 wherein the alloy forming material is steel alloy forming material.

7. The method of claim 6 wherein the steel alloy forming material is iron, manganese and carbon.

8. The method of claim 1 wherein the alloy forming material is selected from the class consisting of scrap iron and sponge iron.

9. The method of claim 1 wherein the alloy forming material is iron oxide.

10. The method of claim 9 wherein the iron oxide is selected from the class consisting of $Fe_2O_3$ and $Fe_3O_4$.

* * * * *